Nov. 12, 1963     V. CIMBALI     3,110,243

COFFEE MAKING MACHINES

Filed March 30, 1961

United States Patent Office 3,110,243
Patented Nov. 12, 1963

3,110,243
COFFEE MAKING MACHINES
Vittorio Cimbali, Foro Bonaparte 18, Milan, Italy
Filed Mar. 30, 1961, Ser. No. 99,547
Claims priority, application Italy Dec. 23, 1960
4 Claims. (Cl. 99—302)

This invention concerns coffee making machines, for preparing so-called "cream of coffee," in which the coffee that seeps into the coffee-cups presents a thick surface of golden froth. Such a drink is obtained by causing hot water to percolate through a measure of ground coffee at a pressure of 5–8 atmospheres, and a temperature of 95–98° C.

Formerly so-called "expresso coffee" was obtained by feeding water, heated to 100° and over, through the ground coffee under steam pressure after the water had been left for a few seconds to impregnate the coffee. Such a drink does not have the above mentioned layer of yellow froth and has a burnt taste which does not meet with public favor.

Each of the above mentioned coffee machines is provided with one or more infusion heads containing a piston sliding in a cylinder, whose lower end is closed by the filter full of powdered coffee, the whole constituting the infusion chamber. It is known that in these machines, whether the piston is mechanically, hydraulically or hand operated, one of the greatest difficulties is that of maintaining the water in the infusion chamber at a constant optimum temperature.

This problem becomes more serious when the machine is used some times for preparing coffee with a long interval between two successive infusions, and at other times to prepare a large number of cups in a relatively short space of time.

In a machine with a boiler and one or more infusion heads, it has been found that although the water in the boiler may be maintained at a temperature, say $T°$, the temperature of the infuser wall will be different, say $t°$, and $t° < T°$.

When water at $T°$ is passed into the infuser whose wall temperature is $t°$, there is a change in the temperature $T°$, to say $tk°$, where $t < tk < T$. This is because there has been a loss of heat from the water to the infuser-walls, which now have a temperature of $t + x°$.

Assuming that $tk°$ is the optimum temperature for infusion, and that the machine is being used only at relatively lengthy intervals between each infusion, the wall temperature of the infuser will decrease between each infusion to $t°$ from $t° + x°$, and in each case the coffee dispensed will be the same in flavor and temperature.

If, on the other hand, the machine is used very often, with very short intervals between each infusion, the wall temperature no longer decreases to $t°$, and thus, after $n$ infusions, the infuser wall temperature will be $t° + nx°$.

Due to the increase in temperature above the optimum value, the flavor of the coffee will be affected.

It has been proposed to overcome this problem of temperature-control by adding to the water from the boiler a quantity of cold water, so that the temperature $T°$ is reduced to $tk°$ prior to infusion, or alternatively, to provide a cold water jacket around the infusion chamber.

Partial success has, in some cases, been achieved by the use of a water jacket, but a further difficulty has arisen, namely that of controlling the amount of heat lost from the infuser.

In the system in which cold water is added prior to infusion, it has been found that an expensive and sensitive thermostat is required and that, furthermore, only partial success is achieved.

In the case of automatic machines of the kind employing a hydraulic servo-cylinder and piston, the dimensions of the cylinder and the infuser and their thermo-conductor relationship have a vital influence and may be used to overcome the problem, but, again, the coffee machine so obtained is expensive, and only partial success is achieved.

One of the objects of my invention is to provide a construction capable of maintaining the optimum temperature of the infusion water both in the case of infusions at relatively lengthy time intervals, and in the case of infusions at small time intervals, in a simple and effective manner.

My invention is a coffee machine comprising a boiler and infusion heads. The latter consist of a piston sliding in a cylinder, whose lower chamber, closed at its lower end by means of a filter and containing the ground coffee, acts as an infusion chamber. For each infusion-head there is a container situated inside the boiler, the top of the container being connected internally to a fresh water inlet duct, contained in the body of the head and fed from outside the machine. A second outlet duct leads from the bottom of the container to the infusion chamber. The capacity of the container is about twice that of the infusion chamber.

Experiments have proved that the above mentioned problem is overcome. As to the first mentioned purpose, i.e. that of maintaining the infusion-water at the optimum temperature, both in the case of infusion at relatively lengthy intervals and with short intervals of time between each infusion, the temperature remains rather lower than $T°$ and it becomes lower and lower the shorter the time interval, i.e. the more frequently coffee is made. Thus, there is avoided the danger of overheating the head in the case of frequent preparations of coffee.

My invention will be better understood with the help of the drawings in which.

Figure 3:
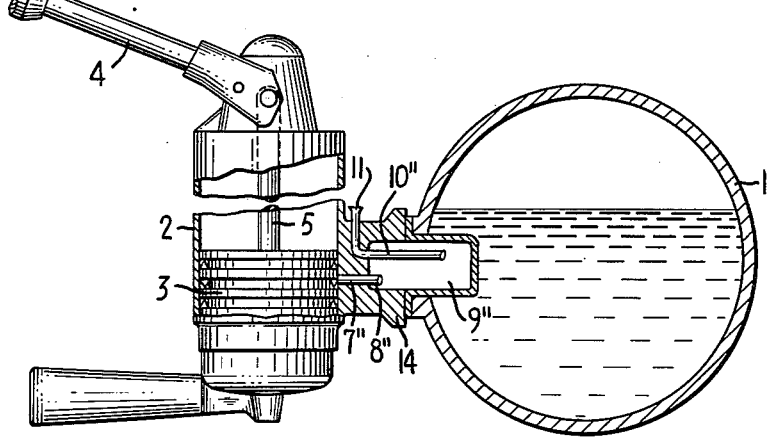

FIG. 3 an analogous view of a further embodiment.

Figure 1:
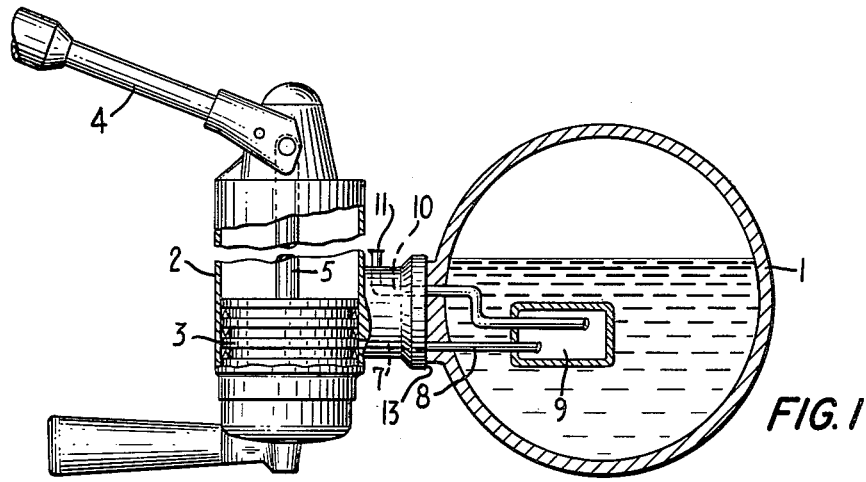
FIG. 1 is a partial section of a first embodiment of the invention.

As regards FIGURE 1, reference numeral 1 indicates the boiler to which are connected one or more infuser-heads, only, one, however, appearing in the drawing.

In the head can be seen cylinder 2, in whose chamber a piston 3 slides with a water tight contact, which may be lifted by hand with the help of the lever 4 hinged to piston rod 5.

The cylinder chamber is closed at its bottom by means of the filter containing the ground coffee. The infusion chamber of the cylinder is connected to a duct 7, fitted in the body of the head, whose extension 8 passes through the boiler wall into the lower part of container 9. Another duct 10 is situated in the infuser head; at one end it comes out at 11 and is connected to a fresh water source, while at its other end, said duct passes through the wall of the boiler and through that of the container, into which it opens at almost the opposite end of the same.

Figure 2:
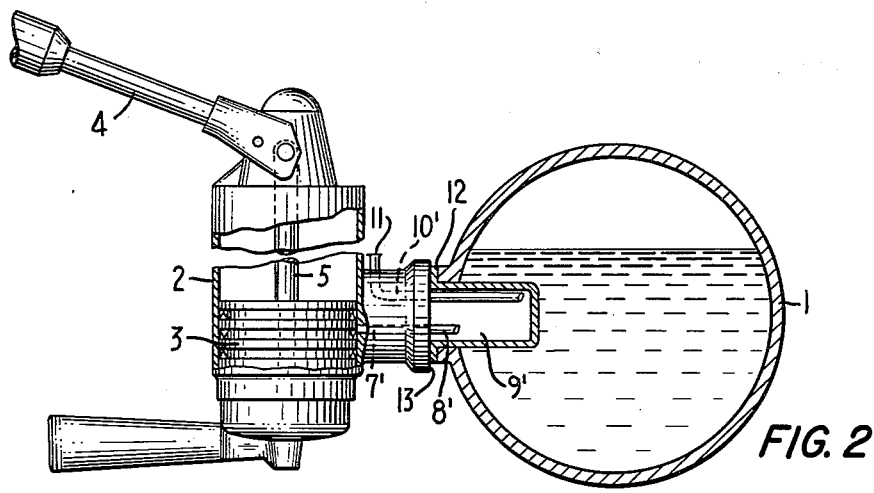
FIG. 2 is an analogous view of a further embodiment.

The modification in FIGURE 2 shows a cup-shaped container which is provided, at its open end, with a flange 12, the face of which abuts on the flat and ring-shaped surface 13 of the head. Ducts analogous to those shown in the preceding embodiment are also provided to connect the cavity of said container to the fresh water source and to the infusion chamber.

The modification in FIGURE 3 shows an infusion head with a flange 14 instead of a flat surface 13, said flange having a cavity in alignment with the cavity of the cup 9 to form a single cavity. The modifications above described provide deeper penetration into the infuser head, with the consequence that the temperature $t°$ of the head, when the boiler is in working-condition, but coffee is not being made, is always nearer to temperature $T°$, with the advantage that temperature $T°$ may be kept lower so that the operation of the boiler is less arduous.

I claim:

1. A machine for making "cream of coffee" comprising a boiler, at least one infusion head including means defining a cylinder therein, a piston slidable in said cylinder, a filter in said cylinder below said piston and closing the lower end of said cylinder to define an infusion chamber adapted to contain ground coffee, means defining a container for each infusion head, said container having a capacity about twice that of the infusion chamber and said container being disposed at least partially within said boiler, a first duct communicating with the upper portion of said container, passing through the body of the infusion head and opening exteriorly of the machine into a connection to a fresh water source, and a second duct communicating with the lower portion of said container, passing through the infusion head and communicating with the infusion chamber.

2. A machine for making "cream of coffee" comprising a boiler, at least one infusion head including means defining a cylinder therein, a piston slidable in said cylinder, a filter in said cylinder below said piston and closing the lower end of said cylinder to define an infusion chamber adapted to contain ground coffee, means defining a container for each infusion head, said container having a capacity about twice that of the infusion chamber and said container being disposed at least partially within said boiler and being thermally and mechanically connected to said head, a first duct communicating with the upper portion of said container, passing through the body of the infusion head and opening exteriorly of the machine into a connection to a fresh water source, and a second duct communicating with the lower portion of said container, passing through the infusion head and communicating with the infusion chamber.

3. A machine for making "cream of coffee" comprising a boiler having a flat annular outer surface, at least one infusion head having a flat annular surface and including means defining a cylinder therein, a piston slidable in said cylinder, a filter in said cylinder below said piston and closing the lower end of said cylinder to define an infusion chamber adapted to contain the ground coffee, means defining a container for each infusion head, said container having a capacity about twice that of the infusion chamber and said container being disposed at least partially within said boiler, said container being cup-shaped and provided at its open end with a flange, one face of the same abutting against the flat annular surface of the outer surface of the boiler, and the other face of the flange abutting the flat annular surface of the infusion head, a first duct communicating with the upper portion of said container, passing through the body of the infusion head and opening exteriorly of the machine into a connection to a fresh water source, and a second duct communicating with the lower portion of said container, passing through the infusion head and communicating with the infusion chamber.

4. A machine for making "cream of coffee" comprising a boiler having an opening surrounded by a flat annular surface, at least one infusion head having a cavity surrounded by a flat annular surface including means defining a cylinder therein, a piston slidable in said cylinder, a filter in said cylinder below said piston and closing the lower end of said cylinder to define an infusion chamber adapted to contain the ground coffee, means defining a container for each infusion head, said container having a capacity about twice that of the infusion chamber and said container being disposed at least partially within said boiler, said container being cup-shaped and provided at its open end with a flange, one face of said flange abutting on the flat annular surface of the boiler and the other face of the flange of the container abutting on the flat annular surface of the head, with the cavity of the head and that of the container merging to form a single cavity, a first duct communicating with the upper portion of said container, passing through the body of the infusion head and opening exteriorly of the machine into a connection to a fresh water source, and a second duct communicating with the lower portion of said container, passing through the infusion head and communicating with the infusion chamber.

References Cited in the file of this patent

FOREIGN PATENTS

| | | |
|---|---|---|
| 1,161,025 | France | Mar. 17, 1958 |
| 562,728 | Belgium | May 27, 1958 |
| 808,538 | Great Britain | Feb. 4, 1959 |